(12) United States Patent
Shawcroft

(10) Patent No.: US 12,357,995 B2
(45) Date of Patent: Jul. 15, 2025

(54) SLIDE TRAY ASSEMBLY

(71) Applicant: LEICA BIOSYSTEMS MELBOURNE PTY LTD, Mount Waverley (AU)

(72) Inventor: Brenden Anthony Shawcroft, Melbourne (AU)

(73) Assignee: LEICA BIOSYSTEMS MELBOURNE PTY LTD, Mount Waverley (AU)

( * ) Notice: Subject to any disclaimer, the term of this patent is extended or adjusted under 35 U.S.C. 154(b) by 713 days.

(21) Appl. No.: 17/278,993

(22) PCT Filed: Dec. 19, 2019

(86) PCT No.: PCT/AU2019/051407
§ 371 (c)(1),
(2) Date: Mar. 23, 2021

(87) PCT Pub. No.: WO2020/124154
PCT Pub. Date: Jun. 25, 2020

(65) Prior Publication Data
US 2022/0032309 A1    Feb. 3, 2022

(30) Foreign Application Priority Data
Dec. 20, 2018   (AU) ................ 2018904849

(51) Int. Cl.
*B01L 9/00*    (2006.01)
(52) U.S. Cl.
CPC ........... *B01L 9/52* (2013.01); *B01L 2200/025* (2013.01); *B01L 2200/04* (2013.01);
(Continued)

(58) Field of Classification Search
CPC .. B01L 9/52; B01L 2200/025; B01L 2200/04; B01L 2200/141; B01L 2300/021;
(Continued)

(56) References Cited

U.S. PATENT DOCUMENTS 5,265,726 A    11/1993  Johnson
6,746,851 B1   6/2004   Tseung et al.
(Continued)

FOREIGN PATENT DOCUMENTS

CN    102445368 A    5/2012
CN    203064777 U    7/2013
(Continued)

OTHER PUBLICATIONS

International Search Report for PCT/AU2019/051407 dated Feb. 27, 2020 [PCT/ISA/210].
(Continued)

*Primary Examiner* — Jill A Warden
*Assistant Examiner* — Michael Stanley Gzybowski
(74) *Attorney, Agent, or Firm* — Kinney & Lange, P.A.

(57) ABSTRACT

A slide tray assembly for an slide input module or an slide output module of an automated treatment apparatus for treating tissue samples disposed on slides, the slide tray assembly comprising: a slide tray; and a slide tray cover adjacent to the slide tray forming one or more voids between the slide tray and the slide tray cover for receiving slides therein, wherein the slide tray cover comprises an indent at one end of the slide tray cover so that a slide handling robot of the automated treatment apparatus and an operator of the automated treatment apparatus can access the slides in the voids via the indent.

9 Claims, 6 Drawing Sheets

(52) U.S. Cl.
CPC ... *B01L 2200/141* (2013.01); *B01L 2300/021* (2013.01); *B01L 2300/047* (2013.01); *B01L 2300/0609* (2013.01); *B01L 2300/0822* (2013.01)

(58) Field of Classification Search
CPC ....... B01L 2300/047; B01L 2300/0609; B01L 2300/0822
See application file for complete search history.

(56) References Cited

U.S. PATENT DOCUMENTS

| | | | |
|---|---|---|---|
| 6,847,481 | B1 | 1/2005 | Ludl et al. |
| 8,722,412 | B2 | 5/2014 | Egle et al. |
| 9,528,918 | B2 | 12/2016 | Reinhardt et al. |
| 2004/0251796 | A1 | 12/2004 | Wood |
| 2005/0186114 | A1 | 8/2005 | Reinhardt et al. |
| 2006/0120921 | A1 | 6/2006 | Elliot et al. |
| 2006/0134793 | A1 | 6/2006 | Key et al. |
| 2006/0265133 | A1* | 11/2006 | Cocks ............... G01N 1/312 702/19 |
| 2007/0242349 | A1 | 10/2007 | Tafas |
| 2010/0065458 | A1 | 3/2010 | Myers et al. |
| 2011/0136135 | A1 | 6/2011 | Larsen et al. |
| 2012/0171003 | A1 | 7/2012 | Egle et al. |
| 2013/0123979 | A1 | 5/2013 | Elliot et al. |
| 2013/0201553 | A1 | 8/2013 | James et al. |
| 2014/0186883 | A1 | 7/2014 | Eckert et al. |
| 2015/0186114 | A1 | 7/2015 | Chirhart |
| 2015/0253225 | A1 | 9/2015 | Ng et al. |
| 2015/0260621 | A1 | 9/2015 | Scott et al. |
| 2015/0300931 | A1 | 10/2015 | Dockrill et al. |
| 2017/0252748 | A1* | 9/2017 | Jonca ............... B01L 9/52 |

FOREIGN PATENT DOCUMENTS

| | | |
|---|---|---|
| CN | 203484177 U | 3/2014 |
| CN | 104136123 A | 11/2014 |
| CN | 104502171 A | 4/2015 |
| CN | 205246405 U | 5/2016 |
| CN | 105739076 A | 7/2016 |
| CN | 206262582 U | 6/2017 |
| CN | 206876462 U | 1/2018 |
| CN | 108931412 A | 12/2018 |
| DE | 102015113934 A1 | 2/2017 |
| EP | 2 638 381 A1 | 9/2013 |
| GB | 1001426 A | 8/1965 |
| JP | H04310841 A | 11/1992 |
| JP | 2002267942 A | 9/2002 |
| JP | 2003021637 A | 1/2003 |
| JP | 2005506535 A | 3/2005 |
| JP | 2005527811 A | 9/2005 |
| JP | 2007084111 A | 4/2007 |
| JP | 2007517509 A | 7/2007 |
| JP | 2012137293 A | 7/2012 |
| JP | 2013040974 A | 2/2013 |
| JP | 2013513782 A | 4/2013 |
| JP | 2016006534 A | 1/2016 |
| KR | 20040095081 A | 11/2004 |
| KR | 20150100761 A | 9/2015 |
| KR | 20160099295 A | 8/2016 |
| WO | 0039004 A1 | 7/2000 |
| WO | 2004110625 A1 | 12/2004 |
| WO | 2012/064873 A1 | 5/2012 |
| WO | 2013/071358 A2 | 5/2013 |
| WO | 2015/106008 A1 | 7/2015 |

OTHER PUBLICATIONS

Written Opinion for PCT/AU2019/051407 dated Feb. 27, 2020 [PCT/ISA/237].
Office Action issued Jul. 18, 2023 in Japanese Application No. 2021-516723.
Extended European Search Report issued Sep. 22, 2021 in European Application No. 19897591.4.
Communication dated Jan. 31, 2024, issued in Chinese Application No. 201980063222.9.
Korean Notice of Preliminary Rejection for Korean Patent Application No. 10-2021-7009101, dated Oct. 25, 2024, 11 pages.
Chinese Office Action for Chinese Patent Application No. 201980063222.9, dated Jul. 11, 2024, 22 pages.
Chinese Office Action for Chinese Patent Application No. 201980063222.9, dated Nov. 18, 2024, 26 pages.
Examination Report for Australian Patent Application No. 2019410098, dated Jun. 24, 2024, 3 pages.
Examination Report for European Patent Application No. 19897591.4, dated Jun. 28, 2024, 4 pages.

* cited by examiner

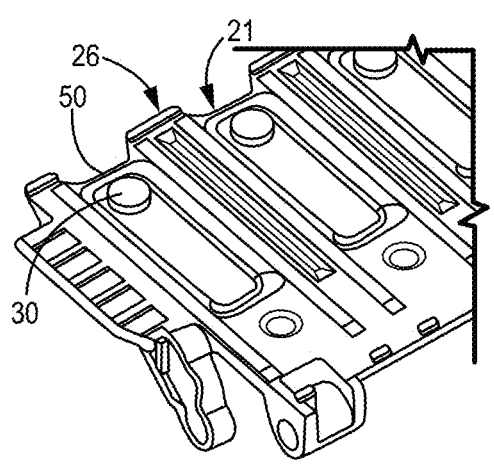 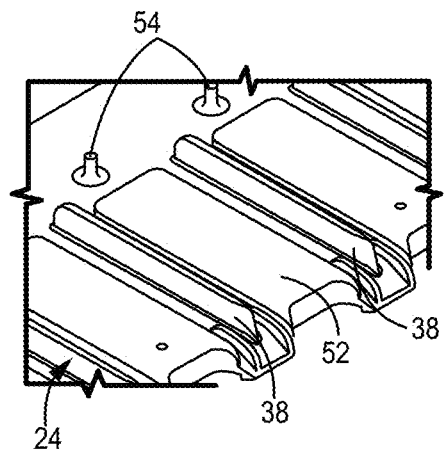
FIG. 6  FIG. 7
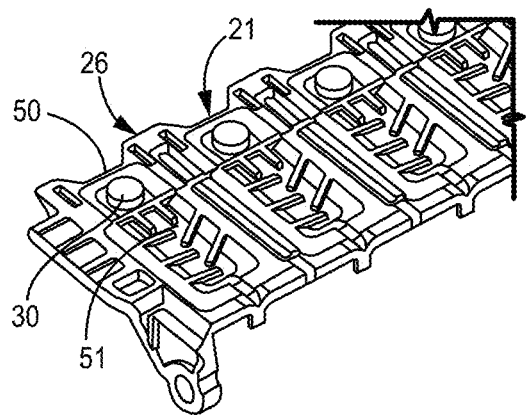
FIG. 8
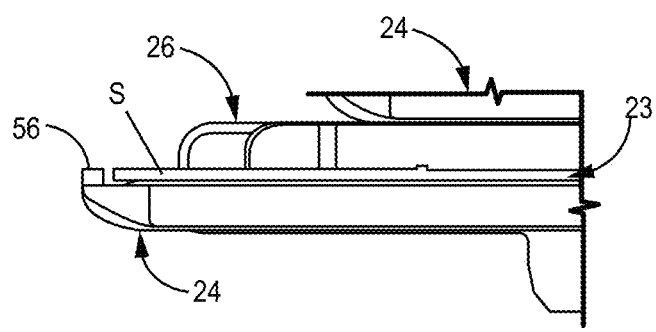
FIG. 9

SLIDE TRAY ASSEMBLY

CROSS REFERENCE TO RELATED APPLICATIONS

This application is a National Stage of International Application No. PCT/AU2019/051407 filed Dec. 19, 2019, claiming priority based on Australian Patent Application No. 2018904849 filed Dec. 20, 2018.

TECHNICAL FIELD

The present invention relates to a slide tray assembly for a slide input module or a slide output module of an automated staining apparatus for treating tissue samples disposed on slides. In particular, the present invention relates to forming one or more voids in the slide tray assembly for receiving slides therein, and a slide handling robot of the automated treatment apparatus and an operator of the automated treatment apparatus can access the slides in the voids.

BACKGROUND OF INVENTION

Instrumentation for automated treatment of biological samples, such as anatomical pathology samples, is well known. Treatment may comprise staining procedures of the kinds that are typical in immunochemistry, in-situ hybridisation, special staining and cytology. Automation of some staining procedures has increased the speed with which pathology testing can be completed leading to earlier diagnosis and in some cases, intervention. Staining is typically performed on samples placed on microscopy slides to highlight certain histological features in a biological sample and incubation of the sample with small volumes of reagent is often performed. In many cases, automated staining of samples involves manipulation of robotic arms to deliver an aliquot of reagent to achieve staining.

In an example of an existing automated treatment apparatus in use, tissue samples are placed on slides and moved to slide treatment modules of the apparatus to be treated using reagents. The treatment of the samples here is performed automatically by one or more robots configured to dispense reagents to the samples on the slides in a predetermined sequence according to a staining protocol. Robots are also used to move slides automatically within the apparatus from an slide input module, where the slides are first loaded into the apparatus by an operator, to the slide treatment modules for treatment, and then to an output module. In the output module, the slides may sit for a length of time until before being removed by an operator. During this time, tissues samples on the slides may start to dehydrate and potentially be damaged.

Increased throughput of samples on slides through the automated staining apparatus is desirable but can also be problematic with a myriad of moving parts requiring calibration, maintenance and cleaning. In many cases, processed sample throughput is limited by batch processing regimes where sample processing times are limited by the slowest staining protocol (or treatment time) being administered in the batch in the slide treatment modules of the apparatus. Slides with treated tissue samples therein may therefore be located in the output module for varying lengths of time, with those left in the output module the longest either being subject to dehydration or operator intervention to prevent dehydration.

SUMMARY OF INVENTION

One aspect of the present invention provides a slide tray assembly for a slide input module or a slide output module of an automated treatment apparatus for treating tissue samples disposed on slides, the slide tray assembly comprising: a slide tray; and a slide tray cover adjacent to the slide tray forming one or more voids between the slide tray and the slide tray cover for receiving slides therein, wherein the slide tray cover comprises an indent at one end of the slide tray cover so that a slide handling robot of the automated treatment apparatus and an operator of the automated treatment apparatus can access the slides in the voids via the indent.

In an embodiment, the slide tray assembly is moveable between an open position in which the operator of the automated treatment apparatus can access the slides in the voids and a closed position in which the slide handling robot of the automated treatment apparatus can access the slides in the voids. Preferably, the slide tray assembly is pivoted between the open and the closed position.

In an embodiment, the slide input module and the slide output module have a door, and the slide tray assembly is mounted to the door such that the operator can open the door when in the closed position which pivots the slide tray assembly to the open position. Further, the slide tray cover is pivotally connected to the slide tray. Thus, the slide tray and the inside of the slide tray cover can readily be accessed and can be cleaned.

In an embodiment, the slide tray cover is pivotally connected to four slide trays, and the four slide trays are staggered longitudinally relative to the each other so that the slide handling robot and the operator can access the slides in the voids. Preferably, the slide tray assembly comprises twenty four voids.

For example, the voids are arranged in four rows of six columns. These voids enable slides to be located by the operator into the slide input module and by the slide handling robot into the slide output module. That is, after the apparatus treats tissue samples on the slides in slide treatment modules of the apparatus, the slide handling robot locates the slides into the voids of the slide output module. In an embodiment, the slides keep hydrated in the slide output module before being retrieved by an operator of the apparatus. In use of the apparatus, for instance, the slides may be located in the voids of the slide output module for up to twelve hours and the slides will stay hydrated in the slide output module even if the apparatus is bumped.

In an embodiment, the slide tray comprises datum references to enhance positional accuracy of the slide handling robot locating the slides in the voids.

In an embodiment, the indent is further configured to minimise said tissue samples on the slides scraping on the slide tray cover when the slide is located in the void. For example, the indent is a scalloped slide input that is configured to minimise instances of tissue samples on the slides scraping on the slide tray cover when the slides are located in the void by the operator or the robot.

In an embodiment, the slide tray comprises datum references to enhance positional accuracy of the slide handling robot locating the slides in the voids.

In an embodiment, the slide tray comprises a slide retaining lip at one end adjacent the indent in the slide tray cover. Thus, for example, if the apparatus is accidentally bumped, the slide is not ejected from the void.

BRIEF DESCRIPTION OF DRAWINGS

FIG. 6 is a perspective view of part of a slide output tray cover according to an embodiment of the present invention;

FIG. 7 is a perspective view of part of a slide output tray according to an embodiment of the present invention;

FIG. 8 is a perspective view of part of the slide output tray cover of FIG. 6;

FIG. 9 is a side view of part of a slide output tray assembly according to an embodiment of the present invention;

DETAILED DESCRIPTION

Figure 1:
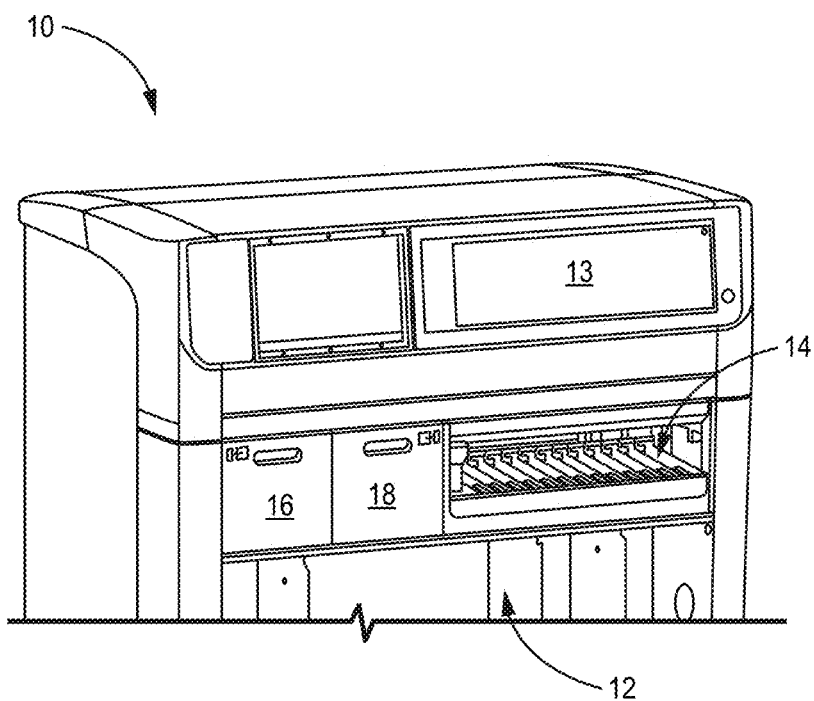
FIG. 1 is a perspective view of an automated slide treatment apparatus according to an embodiment of the present invention.

An automated tissue sample treatment apparatus 10 for treating one or more tissue samples disposed on slides according to an embodiment of the present invention is shown in FIG. 1. In the embodiment, the apparatus 10 comprises a controller (not shown) that is configured to operate the apparatus 10 to automatically treat tissue samples on the slides. However, it will be appreciated by a person skilled in the art that in other embodiments the controller can be implemented remotely from the apparatus 10.

The apparatus 10 comprises a plurality of slide treatment modules (not shown) located under a housing 13 that are arranged to receive the slides for treatment. The apparatus 10 further comprises at least one bulk fluid robot (BFR), also located under the housing 13, configured by the controller to dispense a plurality of reagents stored in reagent containers 12 to the slides received in the slide treatment modules 14 via an output nozzle disposed on the BFRs to treat tissue samples on the slides. In the embodiment, the BFRs are configured by the controller to dispense reagents (e.g. bulk fluid reagents) to the slides, such as oxalic acid, sulphuric acid, potassium permanganate, alcohol, dewaxing agent, haematoxylin, peroxide, citric acid, EDTA, DI water, and Bond™ wash, to treat the tissue samples disposed thereon.

The apparatus 10 also comprises at least one pumping means (not shown) for pumping the reagents to the output nozzle of the BFRs from the reagent containers 12. The BFRs are configured by the controller to dispense these reagents in a predetermined sequence for the sides in the slide treatment modules to treat the one or more tissue samples disposed on each of the slides independently. In order for the reagents to be dispensed, the apparatus 10 comprises a plurality of reagent lines (not shown) associated with each of the reagents which extend from each of the reagent containers 12 via the respective pumping means to the BFRs.

Additionally, the apparatus 10 comprises a fluid transfer probe (FTP) robot, located under the housing 13, configured by the controller to dispense a plurality of high value reagents stored in high value reagent containers 14 to the slides in the slide treatment modules via an FTP nozzle disposed on the FTP robot to the tissue samples. Thus, in use, the BFRs and the FTP robot are configured by the controller to dispense bulk fluid reagents and high value reagents in a predetermined sequence to treat the tissue samples on the slides and, in one example, stain the tissue samples according to a predetermined staining protocol for in-situ hybridization (ISH) and immunohistochemical (IHC) applications. Thus, in this way, the BFRs and the FTP robot are configured by the controller to dispense reagents for each of the slide treatment modules to treat (e.g. stain) tissue samples disposed on each of the slides in the slide treatment modules independently.

In an embodiment, the FTP robot is also configured by the controller to move the slides in the apparatus 10 between the various modules of the apparatus 10 for treating the tissue samples on each of the slides independently. That is, the FTP robot performs the functions of a slide handling robot of the apparatus 10 as described above.

The FTP robot may comprise a gripper, such as a suction means, to grip a slide and move the slide from an slide input module 16, where an operator of the apparatus 10 introduces slides with tissue samples thereon to the apparatus 10 for treatment, to a slide treatment module 14 so that the tissue samples on the slide can be treated or stained. To do so, the FTP robot is configured by the controller to move in the x, y, z and θ (theta) axes. Also, the BFRs are configured by the controller to move in the x, y and z axes so that they do not interfere with the movement of the slides by the FTP robot. Following treatment, the FTP robot moves the slide S to a slide output module 18 to await removal of the slide S from the apparatus 10. Whilst awaiting removal, the slide output module 18 is configured to maintain hydration of the slide for a designated time such as four to twelve hours.

The primary function of the slide input module 16 is to house slides that require staining and the primary function of the slide output module 18 is to house slides that have finished being stained. These modules 16 18 are accessed by both the operator of the apparatus 18 (when opened) and a slide handling robot, such as the FTP robot, (when closed), and are independent in a way that if the robot is accessing the slide output module 18, an operator can still open the input module 16.

Figure 2:
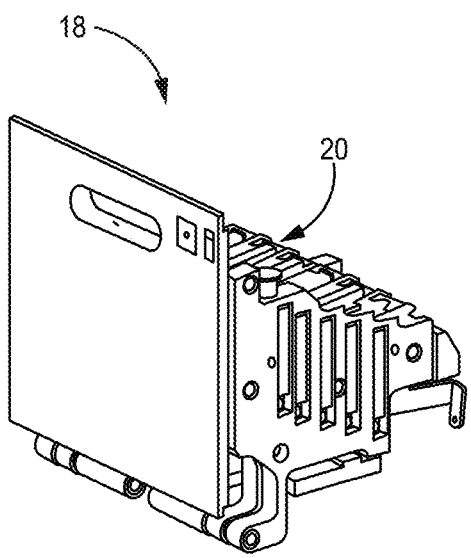
FIG. 2 is a perspective view of a slide output module in the closed position according to an embodiment of the present invention.
Figure 3:
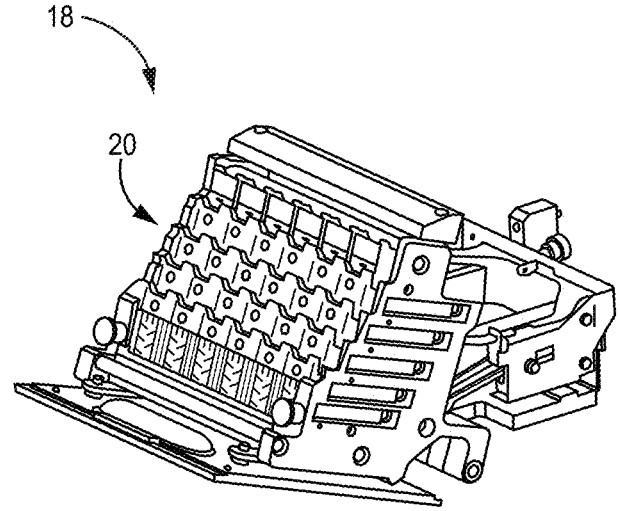
FIG. 3 is a perspective view of the slide output module of FIG. 2 in the open position.
Figure 4:
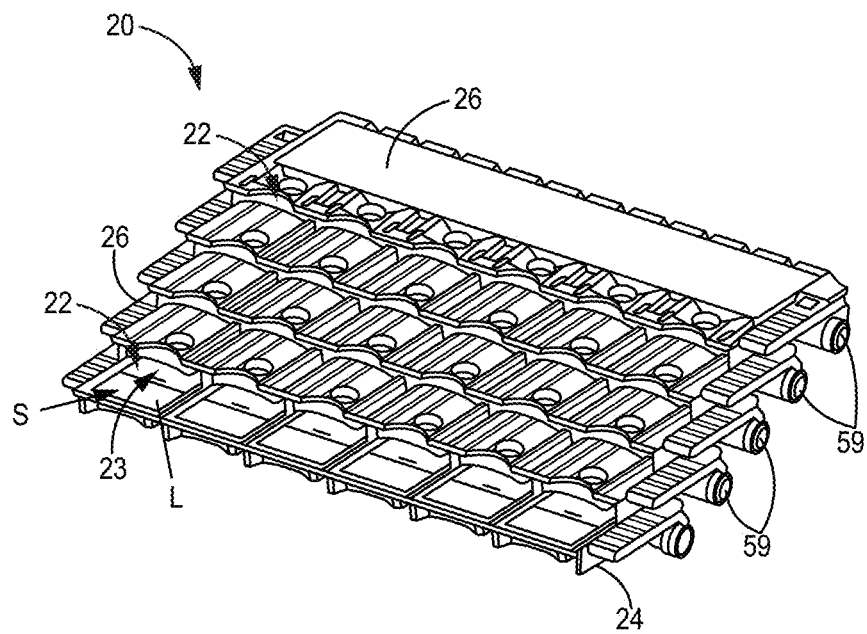
FIG. 4 is a perspective view of a slide output tray assembly according to an embodiment of the present invention.
Figure 14:
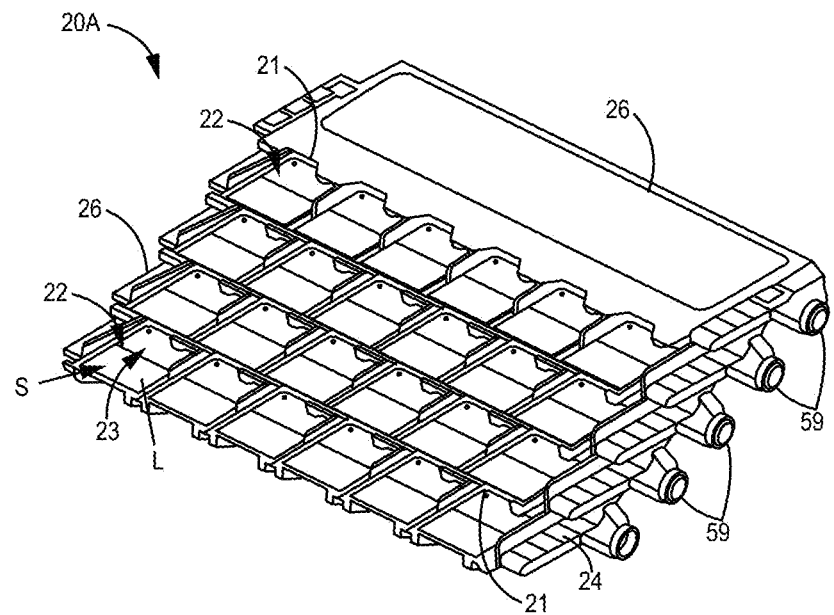
FIG. 14 is a perspective view of a slide input tray assembly according to an embodiment of the present invention.

FIG. 2 and FIG. 3 show the slide output module 18 of the automated treatment apparatus 10 in more detail. FIG. 2 shows the slide output module 18 in the closed position and FIG. 3 shows the slide output module 18 pivoted to the open position. FIG. 4 shows a slide tray assembly 20 for the slide output module 18 and FIG. 14 shows a slide tray assembly 20A for the slide input module 16. The slide tray assembly 20 20A comprises a slide tray 24 and a slide tray cover 26 adjacent to the slide tray 24 forming one or more voids 23 between the slide tray 24 and the slide tray cover 26 for receiving slides therein. The slide tray cover 20 20A comprises an indent 21 at one end of the slide tray cover 26 so that a slide handling robot in the form of the FTP robot of the apparatus 10 and an operator of the apparatus 10 can access the slides in the voids 23 via the indent 21. The indent is also configured to minimise instances of tissue samples on the slides S scraping on the slide tray cover 26 when the slides are located in the voids 23 by the operator or by the FTP robot.

Figure 5:
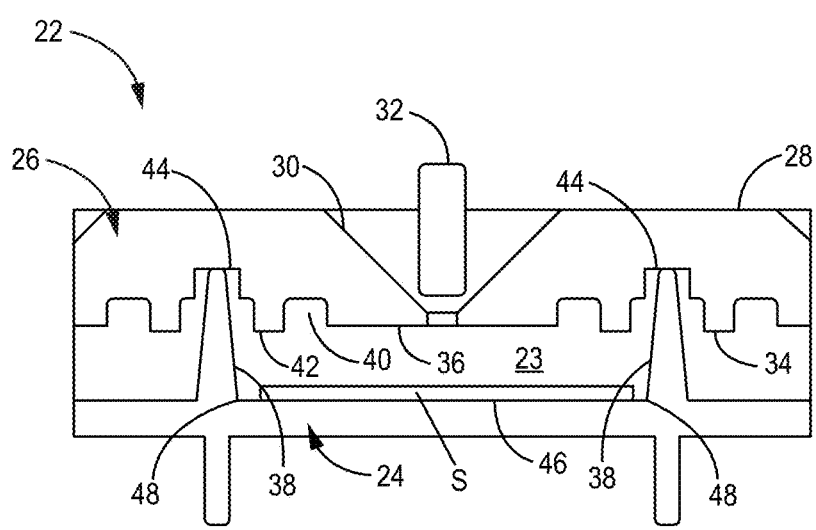
FIG. 5 is a section view of a void formed between a slide output tray and a slide output tray cover according to an embodiment of the present invention.

The slide input module 16 and the slide output module 18 comprise a slide output tray assembly 20 20A comprising twenty four slide positions 22, each having a void 23, which is shown more clearly in FIG. 5, for a slide S to be located therein. To achieve the twenty four slide positions, slide trays 24, shown more clearly in FIGS. 4 and 14, are part of the slide tray assembly 20 20A which stacks the slide trays 24 on top of each other and staggers them like a stair case. The staggered arrangement is to enable Barcode reading and robot access for handling of the slides.

The slide input module 16 and slide output module 18 are not identical due to the special features required for slide hydration which occurs in the slide output module 18 only. Hydration in the slide output module 18 ensures that the slide is readily available to the operator, following staining of the tissue samples on the slide, when they require it and it is not dried out. If output hydration was not implemented, hydration would have to occur in another module of the apparatus 10, such as the slide staining modules. In this case, for instance, the operator would be required to request individual slides from the slide staining modules which would take the robot say 15 seconds to retrieve from a slide staining module. If 24 slides were requested, it would take around 6 minutes.

That is, the staggered design of the slide tray assembly 20 20A allows the most amounts of slides in a small foot print while still being able to identify, handle and hydrate slides in the slide output module 18. The slide tray assemblies 20 20A will attempt to datum the slides S as much as practical in the slide input module 16 to assist robotic alignment of the slides in the slide staining modules and in the slide output module 18 to ease the insertion in the output tray window. The slide output tray assembly 20 20A will have more X and Y clearance for the robot to insert a slide. If, for example, a slide moves out of position during the slide staining module lid opening operation then slide insertion may be compromised.

More specifically, in the embodiment shown in FIG. 4, the slide output tray assembly 20 comprises four slide output trays 24 and four slide output tray covers 26, and each of the slide output trays 24 and the slide output tray covers 26 has four slide positions 22. That is, the slide output trays 24 are adjacent the slide output covers 26 so as to form twenty four slide positions 22. Each of these slide positions 22 forms voids 23, between the slide output trays 24 and the slide output tray covers 26, for receiving slides S therein. FIG. 4 shows one row of six slide positions 22 having slides S received in the voids 23, respectively. Also, each of the slide output trays 24 are pivotally connected to respective slide output covers 26, via axles 59, so that the voids 23 can be accessed and cleaned.

One of the slide positions 22 is shown in more detail in FIG. 5. In this section view of part of the slide output tray assembly 20, it can be seen that the slide output tray cover 26 comprises a first side 28 with a fluid inlet 30 in communication one of the voids 23. The fluid inlet 30 is funnel shaped to facilitate fluid from a dispense probe 32 to be communicated to the void 23 (i.e. there are no sharp edges for the fluid). As mentioned, the fluid is generally DI water to maintain hydration of the slide. Further, in use, the dispense probe 32 is configured to dispense fluid whilst not touching the funnel shaped fluid inlet 30.

The slide output cover 26 also has a second side 34 configured to form a hydration chamber with a slide S in the void 23 to maintain hydration of the slide S with the fluid received from the fluid inlet 30 for a designated time (e.g. 12 hours) following treatment of the slide by the automated staining apparatus 10 (e.g. staining).

The void 23 is bound by a void ceiling 36 in the second side 34 of the slide output tray cover 26, the slide S, and by side walls 38 of the slide output tray 24 extending to the void ceiling 36. As mentioned, the void ceiling 36 comprises a surface that is configured to maintain hydration of the slide S with the fluid received from the fluid inlet 30. In the embodiment, the surface of the void ceiling 36 has a high surface energy material property to enhance the maintenance of the hydration and has a uniform height of around 3 mm relative to the slide S. In addition, the surface of the void ceiling 36 may comprise a finish, such as a textured finish, to maintain hydration of the slide with the fluid received from the fluid inlet 30. Preferably, the fluid (e.g. DI water) comprises a surface tension (e.g. 72.2 dynes/cm) configured to maintain hydration of the slide with the fluid. That is, the fluid forms a meniscus bound by the void ceiling 36 and the slide S to assist in maintaining hydration of the slide S with the fluid. The fluid is thus maintained over the tissue sample disposed on the slide S.

The void ceiling 36 further comprises two recesses 40 extending longitudinally along the void ceiling 36 in a direction relative to the slide S, on either side of the fluid inlet 30, to maintain hydration of the slide with the fluid received from the fluid inlet. Further, the void ceiling 36 comprises rails 42 extending longitudinally and projecting from the recesses 42, respectively. The void ceiling 36 further comprises side wall recesses 44 and the side walls extend into the side wall recesses 44 of the void ceiling 36. The slide S is located in the void 23 on a base 46 of the slide output tray 24 between the side walls 38 and with a gap 48 between each side of the slide S. The base 46 may have rails protruding slightly from the base 46 to reduce the contact area between the under face of the slide S and the base 46 so as to avoid instances of the Slide S sticking to the base 46 or debris sticking to the base 46 which may skew the Slide S relative to the base.

The slide output tray cover 26 is shown in more detail in FIGS. 6 and 8, and the slide output tray 24 is shown in more detail in FIG. 7. Slide S is shown as being located in void 23 formed between the slide output tray cover 26 and the slide output tray 24 in FIG. 9. The slide output tray cover 26 comprises an indent 21 in the form of a scalloped slide input 50 adjacent the fluid inlet 30 that is configured to minimise tissue samples on the slides S scraping on the slide output tray cover 26 when the slide S is located in the void 23 by a robot of the apparatus 10. The slide output tray cover 26 is also configured to drain away excess fluid from the fluid inlet 30 at the opposed end of the tray cover 26 to the fluid inlet 30. FIG. 8 shows the underside of the slide output tray cover 26 having ribs 51 configured to drain the fluid from the fluid inlet 30 over the designated time.

To further assist in locating the slides in the voids, the slide output tray 24 has slide datum references 54 to enhance the positional accuracy of the robot of the apparatus 10 locating slides in the voids 23 shown in FIG. 7. FIG. 7 also shows the slide output tray 24 comprising a fluid output 52, in communication with the void 23. The slide output tray 24 is also provided at a designated angle longitudinally relative to the slide in the apparatus 10 to enhance fluid propagation from the fluid inlet 30 to the fluid outlet 52 over the slide S in the void.

Referring back to FIG. 4, the slides comprise a label L at one end of the slide S, visible to the FTP robot, and the slides S are located in the voids 23 such that fluid propagates from the fluid 30 inlet to the fluid outlet 52 in a direction away from the label L because of the angle of the slide output tray 24. The slide output tray 24 further comprises a slide retaining lip 56, shown in FIG. 9, at one end and the fluid output 52 is at an opposed end to the slide retaining lip 56. The slide retaining lip 56 prevents the slide S from being inadvertently bumped out of the void 23, which may adversely affect the hydration of the slide S, and in some cases into another area of the apparatus 10.

Figure 10:
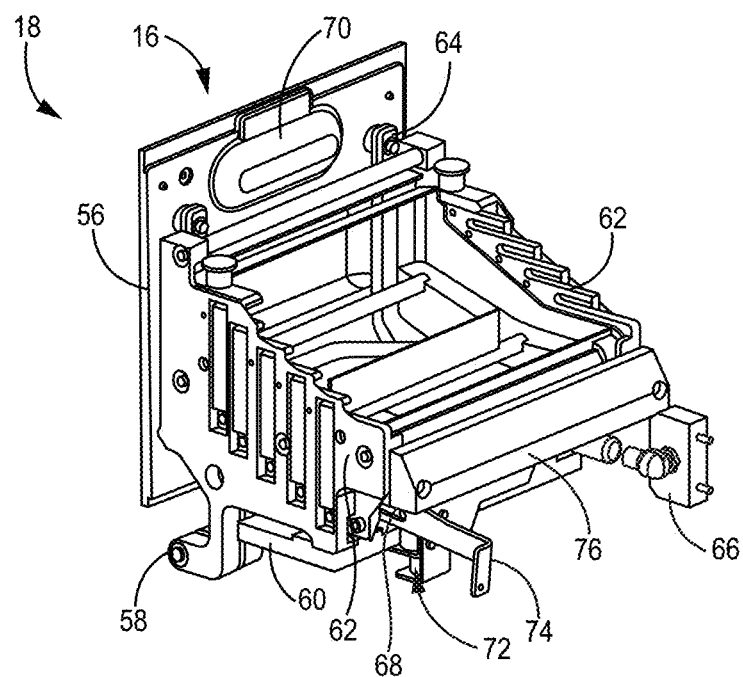
FIG. 10 is a perspective view of a slide output module according to an embodiment of the present invention.

FIGS. 10 to 13 show features of the slide output module 18 in further detail. FIG. 10 shows a slide output module 18 or a slide input module 16, without the tray assembly 20, in the form of a rotary drawer which pivots from the closed position to the open position around an axle 58. The drawers are manually operated using a front door 56. As mentioned, the input 16 and output 18 modules have a capacity of 24 slides in 4 rows of 6 columns. The modules 16 18 are built on a chassis plate 60, which includes a rod holder housing and a fixed rod. The side plates 62 rotate on the rod. A slide tray assembly, such as output slide tray assembly 20, is datumed and locked inside the side plates 62. Door arms 64 are also mounted on the same axle 58 while remaining independent of the side plates 62. Two custom springs installed on each door arm create the lost motion function between the side plates 62 and the door arms 64. It ensures the door 56 and the slide tray assembly 20 are decoupled to avoid instances of hydration failure and to minimise transmission of vibration from door 56 to slide tray assembly 20. In addition, two shoulder bolts screwed on each door arm 64 are picking up the side plates 62 while opening or closing the drawer.

The drawer mechanism uses a hydraulic non-pressurized damper 66 in compression during closing. The damper 66 prevents the user from increasing the drawer's speed while closing it. It reduces the risk of slides falling and DI water spilling while closing the drawer. It does not stop the user from abuse but educates them to not slam the door 56 shut.

The damper 66 retaining force while opening the drawer is minimal. Consequently a soft close damper is used to damp the motion on the open position. Once the door 56 is in the closed position, tension springs will pull the door in against the fascia of the apparatus 10. The tension springs ensure a suitable pulling force for the user while opening. Counterweight 76 also ensures a suitable pulling and closing force for the user.

The drawer locking and presence detection mechanism 72 comprises of an opto-sensor 68, a solenoid, and a check strap 74. The mechanism also includes two shoulder bolts. The solenoid pin is used to push the check strap 74 up. If the operator attempts to open the drawer, the check strap 74 will lock on the shoulder bolt. The lost motion allows the door 56 to slightly open and will not affect slides (or hydration). In case of a power off or deactivation of the solenoid, the check strap 74 goes down on its own weight and unlocks the drawer.

Figure 11:
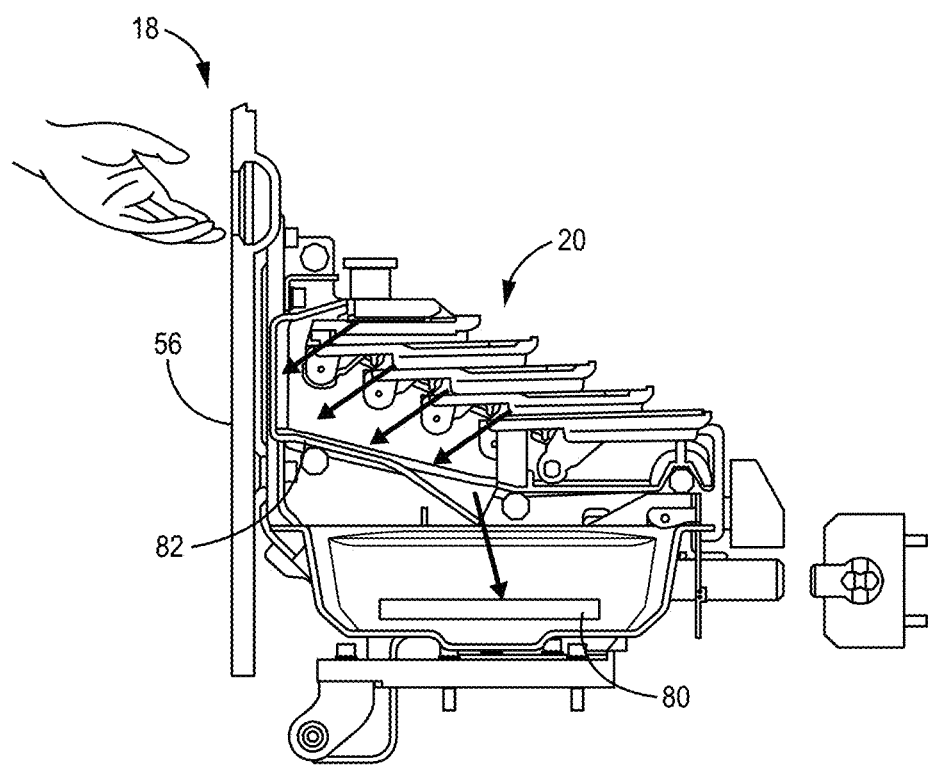
FIG. 11 is a side view of a slide output module in the closed position according to an embodiment of the present invention.

As mentioned, the slide output tray assembly 20 is pivoted between a closed position of the slide output module in which the slides in the voids are accessible by a robot of the automated staining apparatus 10 and an open position of the slide output module 18 in which the slides in the voids are accessible by an operator of the automated staining apparatus 10. The slide output module 18 further comprises a static hydration waste bucket 80 in communication with the voids of the slide output tray assembly 20 via a fluid path 82 so that fluid received from the fluid inlet 30 in the voids is propagated to the static hydration waste bucket 80 when the slide output tray assembly is in the closed position, as shown in FIG. 11. That is, to minimise the amount of fluid left when in the open position, some of the fluid is already transferred to the static hydration waste bucket 80 before the door 56 is opened. The static hydration waste bucket 80 is a cavity with a capacity of around 430 mL. Further, the static hydration waste bucket 80 has a liquid level sensor configured to sense a designated volume of fluid in the static hydration waste bucket 80 to alert the operator or the apparatus 10 to remove the fluid in the static hydration waste bucket 80.

Figure 12:
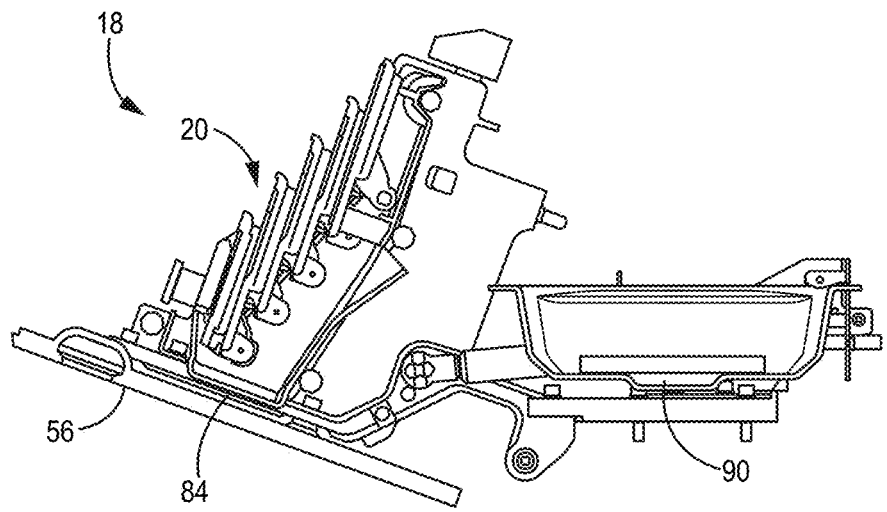
FIG. 12 is a further side view of the slide output module of FIG. 11 in the open position.

The slide output module 18 further comprises a dynamic hydration waste bucket 84 in communication with the voids of the slide output tray assembly 20 so that fluid received from the fluid inlet 30 in the voids is propagated to the dynamic hydration waste bucket 84 when the slide output tray assembly 20 is pivoted from the closed position to the open position, as shown in FIG. 12. The dynamic hydration waste bucket 84 is a cavity with a capacity of around 215 mL, and is configured to stop fluid from splashing out of the bucket 84 while the door 56 is being closed or opened. To do so, the dynamic hydration waste bucket 84 is shaped like a cavity in the door 56 with a wall to prevent the fluid from splashing out of the bucket 84 whilst the door 56 is being opened and closed.

Figure 13:
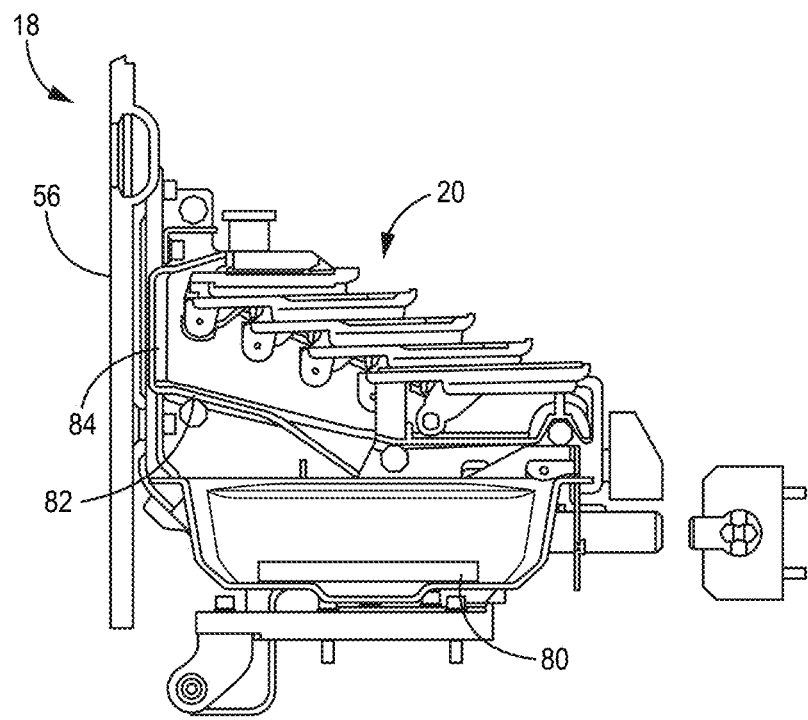
FIG. 13 is a further side view of the slide output module of FIG. 11 in the closed position.

Further, the fluid in the dynamic hydration bucket 84 is propagated to the static hydration waste bucket 80 via the fluid path 82 when the slide output tray assembly 20 is pivoted back to the closed position, as shown in FIG. 13. While the drawer is being closed, the remaining of the fluid is transferred inside the static drain bucket 84.

Figure 15:
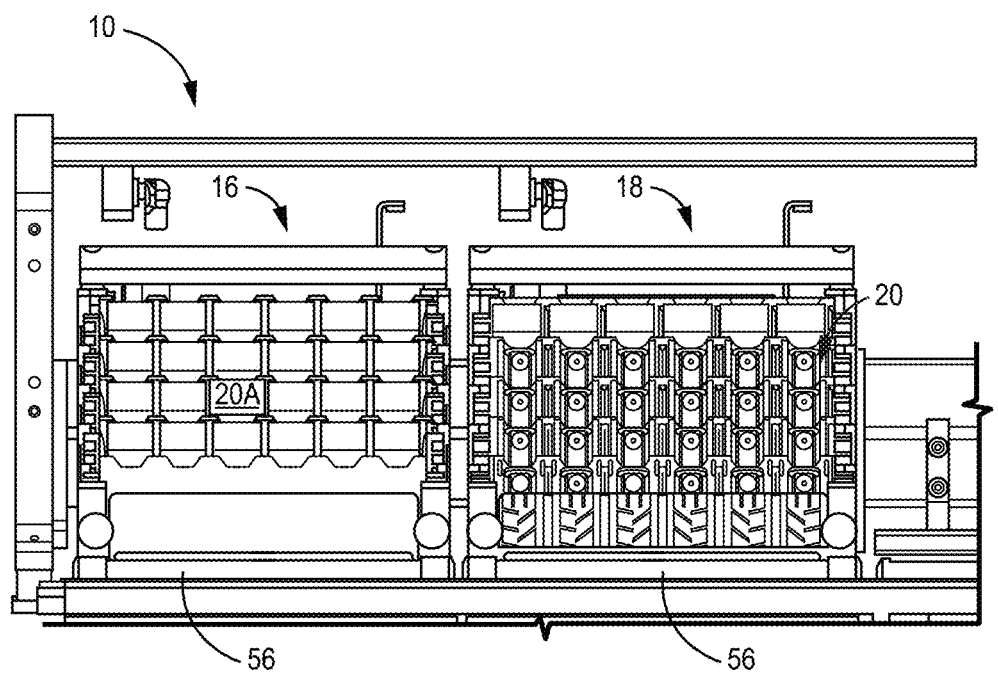
FIG. 15 is a front view of a slide input and output module in the open position according to an embodiment of the present invention.

Referring to FIG. 15, the slide tray assembly 20 20A for both the slide input module 16 and the slide output module 18 is moveable between an open position, shown in this Figure, in which the operator of the apparatus 10 can access the slides S in the voids 23 and a closed position, shown in FIG. 1, in which the FTP robot of the apparatus 10 can access the slides S in the voids 23. As mentioned, the slide input module 16 and the slide output module 28 have a door 56 and the slide tray assembly 20 20A is pivoted between the open and closed position when the operator opens and closes the door 56 around the axle 58. Further, the slide tray cover 26 also pivots from the closed position to the open position around four axles 59 so that the voids 23 can be accessed and cleaned. Specifically, the slide tray cover 26 is pivotally connected to four slide trays 24 via the axles 59 and it can be seen that the four slide trays are staggered longitudinally relative to the each other so that the FTP robot and the operator can access the slides S in the voids 23.

In an embodiment, the controller of the apparatus 10 implements modules on a processor in connection with instructions stored in a memory to control movement and reagent dispensing for each BFR and FTP robot, and fluid dispensing for hydrating tissue samples on the slides via the dispense probe 32. It will be appreciated by those persons skilled in the art that the memory may reside in the computer housed in the apparatus 10 or may be hosted remote from the computer in data communication with the controller.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The discussion of documents, acts, materials, devices, articles and the like is comprised in this specification solely for the purpose of providing a context for the present invention. It is not suggested or represented that any or all of these matters formed part of the prior art base or were common general knowledge in the field relevant to the present invention as it existed before the priority date of each claim of this application.

Throughout the description and claims of this specification, the word "comprise" and variations of the word, such as "comprising" and "comprises", is not intended to exclude other additives, components, integers or steps.

The invention claimed is:

1. A slide tray assembly of an automated treatment apparatus for treating tissue samples disposed on slides, the slide tray assembly comprising:
   a plurality of slide trays; and
   a plurality of slide tray covers, wherein for each slide tray cover of the plurality of slide tray covers, the slide tray cover is adjacent to a respective slide tray forming one or more voids between the respective slide tray and the slide tray cover for receiving slides therein,
   wherein each of the plurality of slide tray covers comprises an indent at one end of the slide tray cover, the indent is a scalloped slide input being configured to minimize tissue samples of the slides scraping on the slide tray cover when the slides are located in the voids by a slide handling robot of the automated treatment apparatus or an operator of the automated treatment apparatus; and
   wherein the plurality of slide trays at least partially overlap and are staggered longitudinally relative to each other so that the slide handling robot or the operator can access the slides in the voids.

2. The slide tray assembly of claim 1, wherein the voids are configured such that when the slides comprising a label at one end are located in the voids, the label is visible to the slide handling robot.

3. The slide tray assembly of claim 1, each of the plurality of slide trays comprises datum references.

4. The slide tray assembly of claim 1, wherein the respective slide tray comprises a slide retaining lip at one end adjacent the indent in the adjacent slide tray cover.

5. The slide tray assembly of claim 1, wherein the slide tray assembly is moveable between an open position in which the operator of the automated treatment apparatus can access the slides in the voids and a closed position in which the slide handling robot of the automated treatment apparatus can access the slides in the voids.

6. The slide tray assembly of claim 5, wherein the slide tray assembly is pivoted between the open and the closed position.

7. The slide tray assembly of claim 1, wherein each of the plurality of slide tray covers is pivotally connected to the respective slide tray.

8. The slide tray assembly of claim 7, wherein the plurality of slide tray covers comprises four slide tray covers and the plurality of slide trays comprises.

9. The slide tray assembly of claim 8, wherein the slide tray assembly comprises twenty four voids.

* * * * *